(12) United States Patent
Sankey et al.

(10) Patent No.: US 6,997,311 B2
(45) Date of Patent: *Feb. 14, 2006

(54) STORAGE CONTAINER FOR DISC-SHAPED ITEMS OF RECORDED MEDIA

(75) Inventors: James K. Sankey, Hudson, OH (US); James M. Byrne, Massillon, OH (US); Michael S. Jaeb, Millersburg, OH (US)

(73) Assignee: Nexpak Corporation, Uniontown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/693,035

(22) Filed: Oct. 24, 2003

(65) Prior Publication Data

US 2004/0084336 A1 May 6, 2004

Related U.S. Application Data

(63) Continuation of application No. 09/904,264, filed on Jul. 12, 2001, now Pat. No. 6,698,586.

(60) Provisional application No. 60/218,198, filed on Jul. 14, 2000.

(51) Int. Cl.
*B65D 85/57* (2006.01)
(52) U.S. Cl. .................. 206/308.1; 206/307; 206/310; D9/423
(58) Field of Classification Search ................ D9/420, D9/423; 206/307, 308.1, 309–311, 387.1, 206/387.13, 493

See application file for complete search history.

(56) References Cited

U.S. PATENT DOCUMENTS

| | | |
|---|---|---|
| 1,440,737 A | 1/1923 | Jones |
| 1,585,846 A | 5/1926 | Frisbie |
| D156,197 S | 11/1949 | Brown |
| 3,109,539 A | 11/1963 | Turoff |
| 3,547,342 A | 12/1970 | Smith |
| 3,825,112 A | 7/1974 | Schumaker et al. |
| 3,949,872 A | 4/1976 | Paudras |
| 4,084,690 A | 4/1978 | Pulse |
| 4,235,334 A | 11/1980 | Ahn |
| 4,327,831 A | 5/1982 | Inaba et al. |
| 4,387,807 A | 6/1983 | De la Rosa |
| D293,507 S | 1/1988 | Ogusu |
| 4,757,896 A | 7/1988 | Huko |
| 4,819,799 A | 4/1989 | Nomula et al. |
| 4,874,085 A | 10/1989 | Grobecker et al. |
| 4,877,130 A | 10/1989 | Matuz |
| 4,895,252 A | 1/1990 | Nomula et al. |
| 4,903,829 A | 2/1990 | Clemens |
| 4,962,854 A | 10/1990 | Ricci |
| 5,011,010 A | 4/1991 | Francis et al. |
| D323,061 S | 1/1992 | Takahashi et al. |

(Continued)

FOREIGN PATENT DOCUMENTS

FR 1 362 872 5/1964

(Continued)

*Primary Examiner*—Jila M. Mohandesi
(74) *Attorney, Agent, or Firm*—Zollinger & Burleson Ltd.

(57) ABSTRACT

A storage container for a disc-shaped item of recorded media includes a base and a lid that is hingedly connected to the base and moveable between open and closed positions. The lid does not cover the entire surface area of the base when the lid is closed. The areas that are not covered are holding tabs that allow the base to be easily held by one hand while the other hand opens the lid and removes the disc. The base includes a hub that has a low overall height that reduces the overall thickness of the storage container.

19 Claims, 7 Drawing Sheets

U.S. PATENT DOCUMENTS

| | | |
|---|---|---|
| D325,468 S | 4/1992 | Ohba |
| 5,188,229 A | 2/1993 | Bernstein |
| 5,238,107 A | 8/1993 | Kownacki |
| 5,249,677 A | 10/1993 | Lim |
| 5,263,580 A | 11/1993 | Ciba et al. |
| 5,284,242 A | 2/1994 | Roth et al. |
| 5,284,243 A | 2/1994 | Gelardi et al. |
| 5,322,162 A | 6/1994 | Melk |
| 5,361,903 A | 11/1994 | Thiele |
| 5,372,253 A | 12/1994 | O'Brien et al. |
| D354,653 S | 1/1995 | Melk |
| 5,377,825 A | 1/1995 | Sykes et al. |
| 5,392,906 A | 2/1995 | Taniyama |
| 5,402,882 A | 4/1995 | Bandy et al. |
| 5,417,324 A | 5/1995 | Joyce et al. |
| 5,433,319 A | 7/1995 | Tang |
| 5,450,953 A | 9/1995 | Reisman |
| 5,462,158 A | 10/1995 | Kramer |
| 5,494,156 A | 2/1996 | Nies |
| 5,529,182 A | 6/1996 | Anderson et al. |
| D375,864 S | 11/1996 | Taniyama |
| 5,586,651 A | 12/1996 | Krummenacher |
| 5,651,457 A | 7/1997 | Lakoski |
| 5,651,458 A | 7/1997 | Brosmith et al. |
| 5,653,335 A | 8/1997 | Bauer et al. |
| 5,685,425 A | 11/1997 | Choi |
| 5,685,427 A | 11/1997 | Kuitems et al. |
| D387,217 S | 12/1997 | Lakoski et al. |
| 5,713,463 A | 2/1998 | Lakoski et al. |
| 5,715,938 A | 2/1998 | Cheris et al. |
| 5,720,384 A | 2/1998 | Wu-Chen |
| 5,746,315 A | 5/1998 | Luckow |
| 5,779,040 A | 7/1998 | Attar et al. |
| 5,806,672 A | 9/1998 | Bosworth |
| 5,819,926 A | 10/1998 | O'Brien et al. |
| 5,829,582 A | 11/1998 | Ippolito et al. |
| 5,845,771 A | 12/1998 | Fu |
| 5,878,878 A | 3/1999 | Wu |
| 5,887,713 A | 3/1999 | Smith et al. |
| 5,894,924 A | 4/1999 | Koch |
| 5,896,986 A | 4/1999 | Bolognia et al. |
| 6,021,894 A | 2/2000 | Lakoski et al. |
| 6,123,191 A * | 9/2000 | Dean .................. 206/310 |
| 6,170,658 B1 | 1/2001 | Dering |
| 6,241,089 B1 | 6/2001 | Grobecker |
| 6,283,280 B1 | 9/2001 | Wong et al. |
| 6,298,986 B1 | 10/2001 | Chang |

FOREIGN PATENT DOCUMENTS

| | | |
|---|---|---|
| FR | 2 587 974 | 4/1987 |
| GB | 1116701 | 6/1968 |
| GB | 2 187 442 A | 9/1987 |
| GB | 2 226 810 A | 7/1990 |
| JP | 62-214568 | 9/1987 |
| WO | WO 88/06559 | 9/1988 |

* cited by examiner

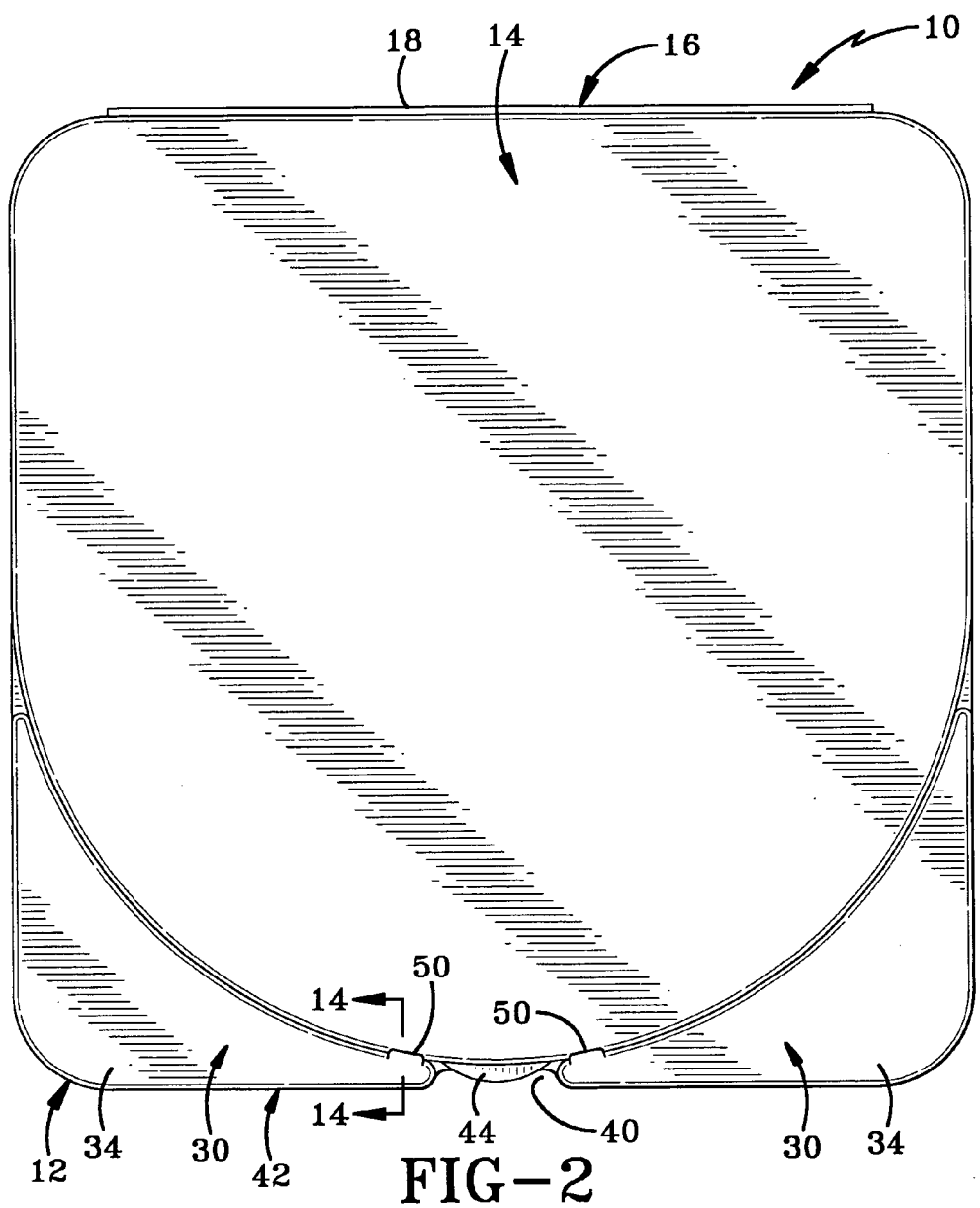
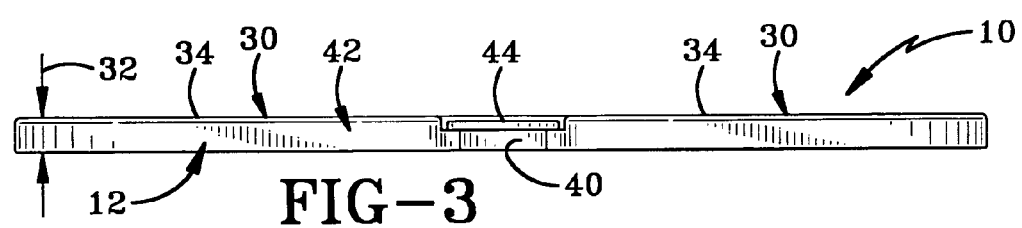
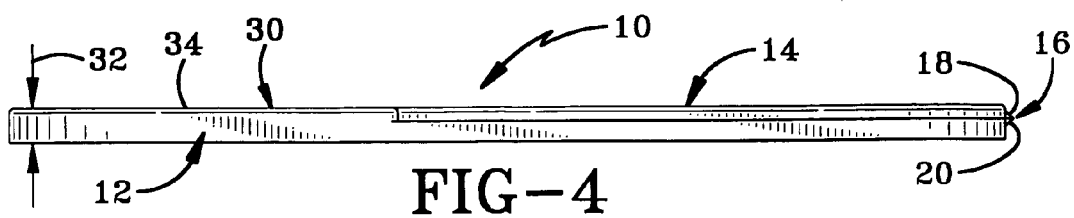

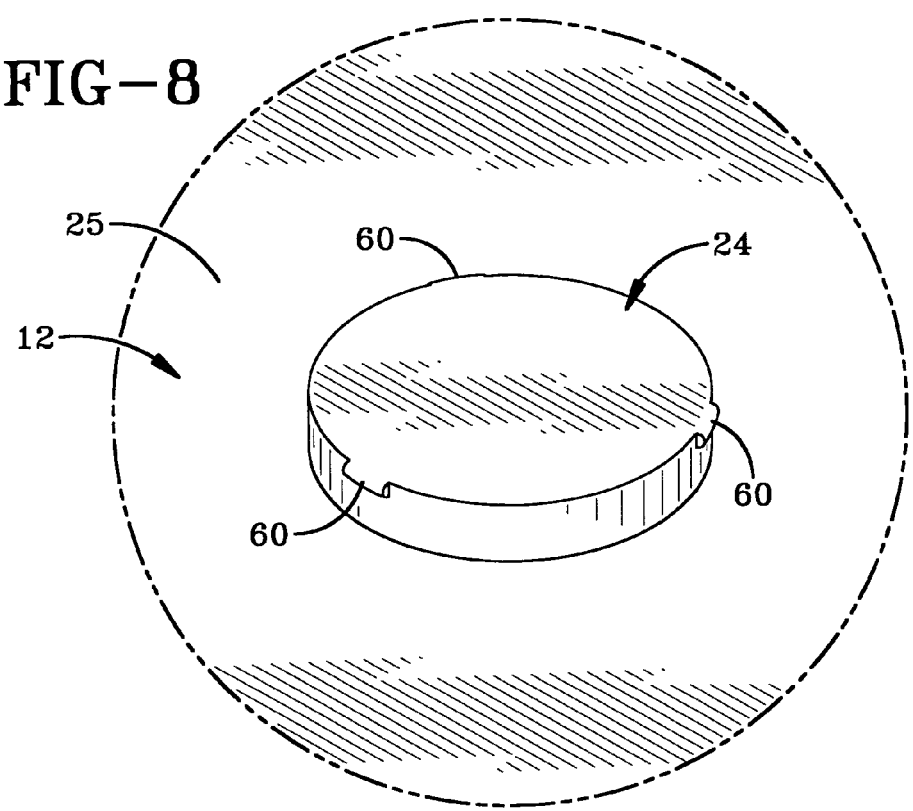
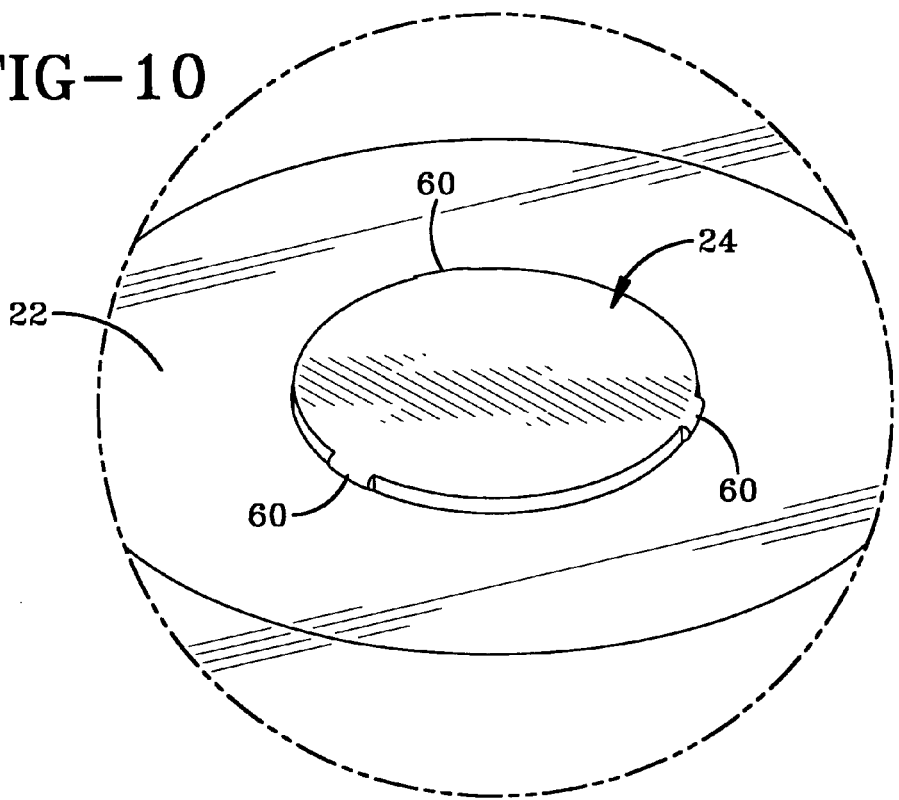

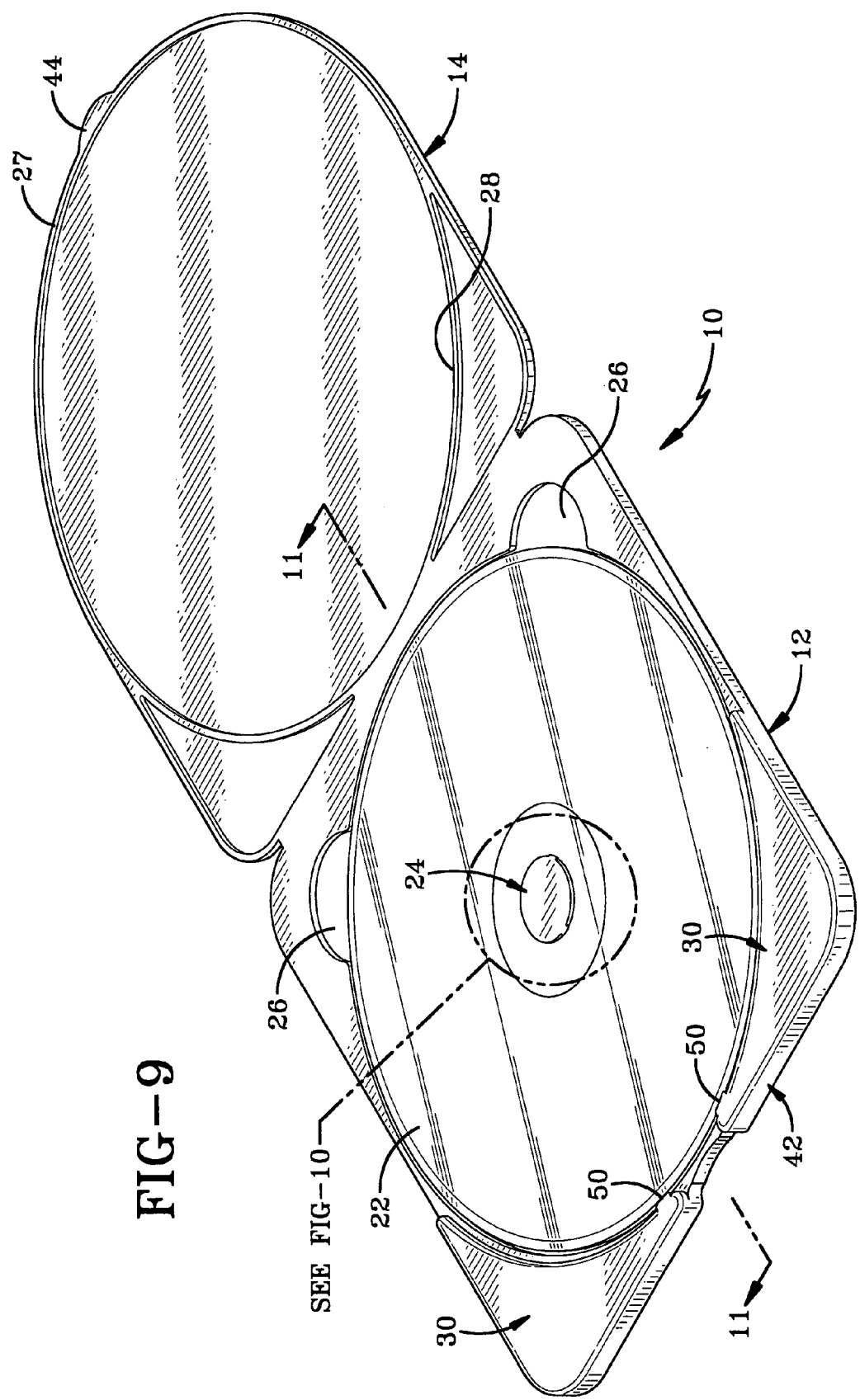

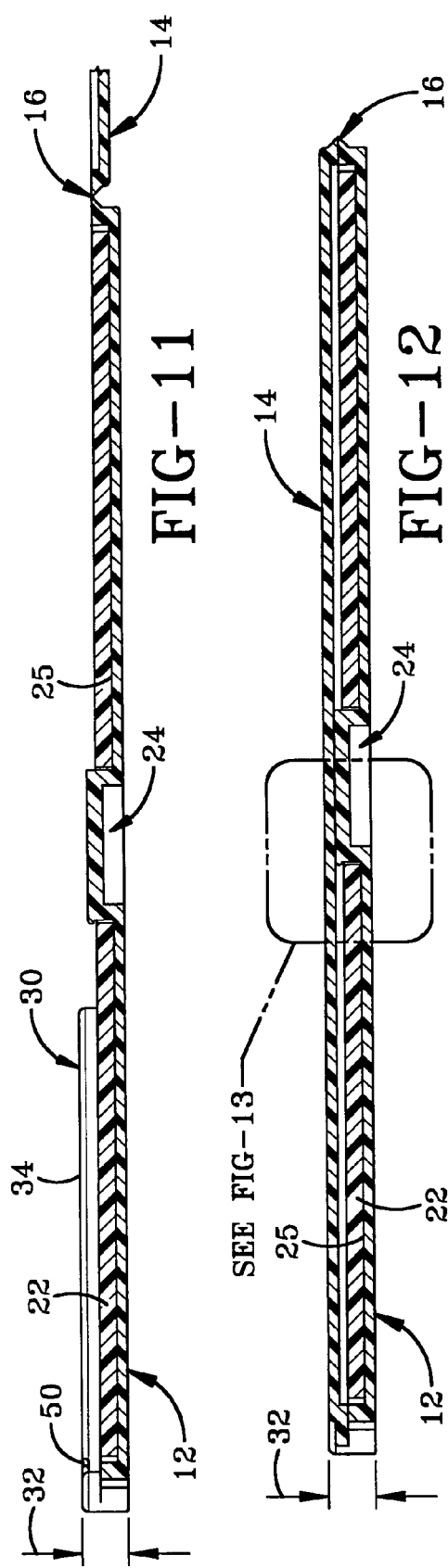
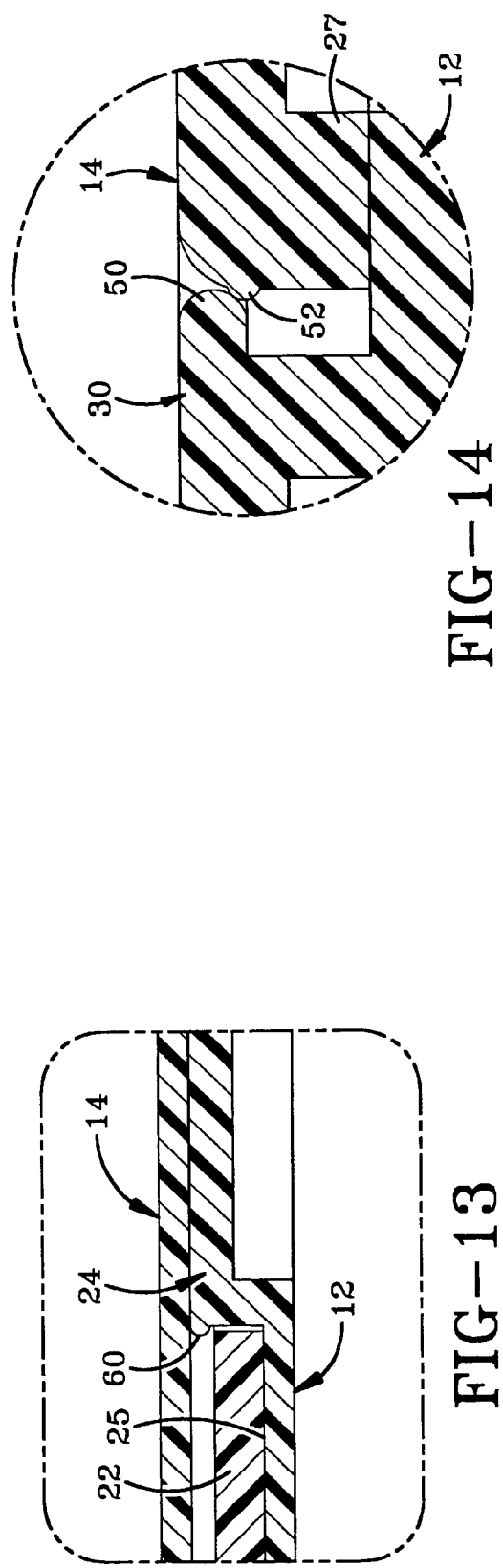

STORAGE CONTAINER FOR DISC-SHAPED ITEMS OF RECORDED MEDIA

CROSS-REFERENCE TO RELATED APPLICATIONS

This application is a continuation of U.S. patent application Ser. No. 09/904,264 filed Jul. 12, 2001 now U.S. Pat. No. 6,698,586, which claims priority from U.S. Provisional Application Ser. No. 60/218,198 filed Jul. 14, 2000, the disclosures of which are incorporated herein by reference.

BACKGROUND OF THE INVENTION

1. Technical Field

The present invention generally relates to storage containers and, more particularly, to storage containers used to hold disc-shaped items of recorded media. Specifically, the present invention relates to a thin storage container having a holding hub having a minimum height with small holding fingers that fit within the container when the container is closed.

2. Background Information

Numerous of types of media are now recorded and stored on disc-shaped items of recorded media such as CDs and DVDs. Such items of recorded media include audio and computer CDs and audio, video, and computer DVDs. Various other types of media may also be recorded on similar types of media. In the past, the disc-shaped items of recorded media have been stored in relatively large and sturdy storage containers in order to protect the items and to house literature that may accompany the disc.

The marketplace is now using recorded media on CDs and DVDs to introduce a wide variety of materials to the general public including distributing free music or free software on a disc through the mail in order to advertise a product or service. Previous large storage containers have been too large, heavy, and expensive to use as mailers. The art thus desires a product that can hold and protect a disc while being small enough to mail with a regular envelope or magazine.

Another problem with larger storage containers is that they occupy a large amount of storage space when grouped together in large quantities. Owners of large quantities of discs desire to safely store the discs in a relatively small space. The storage problem is especially problematic when a large number of discs are stored in a vehicle.

The art also desires that the disc be securely held in the storage container so that the disc does not fall out of the container when the container is opened.

BRIEF SUMMARY OF THE INVENTION

In view of the foregoing, an objective of the present invention is to provide a storage container for a disc-shaped item of recorded media.

Another objective of the present invention is to provide a storage container for a disc-shaped item of recorded media that holds the disc-shaped item of recorded media on a retaining hub.

Another objective of the present invention is to provide a storage container for a disc-shaped item of recorded media that is thin so that the container occupies a minimal amount of space.

Another objective of the present invention is to provide a storage container for a disc-shaped item of recorded media that is easy to hold, open, remove, and replace a disc.

Another objective of the present invention is to provide a storage container for a disc-shaped item of recorded media that securely holds the disc on a retaining hub at the center hole of the disc while positioning the entire retaining hub within the storage compartment of the storage container.

Another objective of the present invention is to provide a storage container for a disc-shaped item of recorded media having a latch disposed at the edge of the container that allows the user to securely grasp the storage container while operating the latch.

These and other objectives and advantages of the invention are achieved by a storage container for holding a disc-shaped item of recorded media that includes a base defining a disc seating area adapted to receive the disc-shaped item of recorded media; a lid hingedly connected to the base between open and closed positions; the lid covering at least a portion of the disc-seating area when the lid is in the closed position; and the base having at least one holding tab that is not covered by the lid when the lid is in the closed position; the holding tab adapted to allow a person to grip the base when opening and closing the lid.

Other objectives and advantages of the invention are achieved by a storage container for holding a disc-shaped item of recorded media; the storage container including a base defining a disc seating area adapted to receive the disc-shaped item of recorded media; a hub connected to the base and disposed in the disc seating area; the hub being adapted to hold the disc-shaped item of recorded media; the hub including a sidewall and a locking finger projecting outwardly from the sidewall; the sidewall having a height and an upper surface; the locking finger having a height substantially less than the height of the sidewall; the sidewall being substantially unmoveable; the locking finger being flexible and adapted to allow a disc-shaped item of recorded media to be forced down over the hub; a lid hingedly connected to the base between open and closed positions; and the lid covering at least a portion of the disc-seating area when the lid is in the closed position.

BRIEF DESCRIPTION OF THE SEVERAL VIEWS OF THE DRAWINGS

FIG. 2 is a top plan view of the storage container with the lid in the closed position;

FIG. 3 is a front elevation view;

FIG. 4 is a right side view;

FIG. 8 is an enlarged view of the encircled portion of FIG. 7;

FIG. 9 is a view similar to FIG. 7 with a disc-shaped item of recorded media disposed in the storage container;

FIG. 10 is an enlarged view of the encircled portion of FIG. 9;

FIG. 11 is a sectional view taken along line 11—11 of FIG. 9;

FIG. 12 is a view similar to FIG. 11 with the lid in the closed position;

FIG. 13 is an enlarged view of the encircled portion of FIG. 12; and

FIG. 14 is a sectional view taken along line 14—14 of FIG. 2.

DETAILED DESCRIPTION OF THE INVENTION

Figure 1:
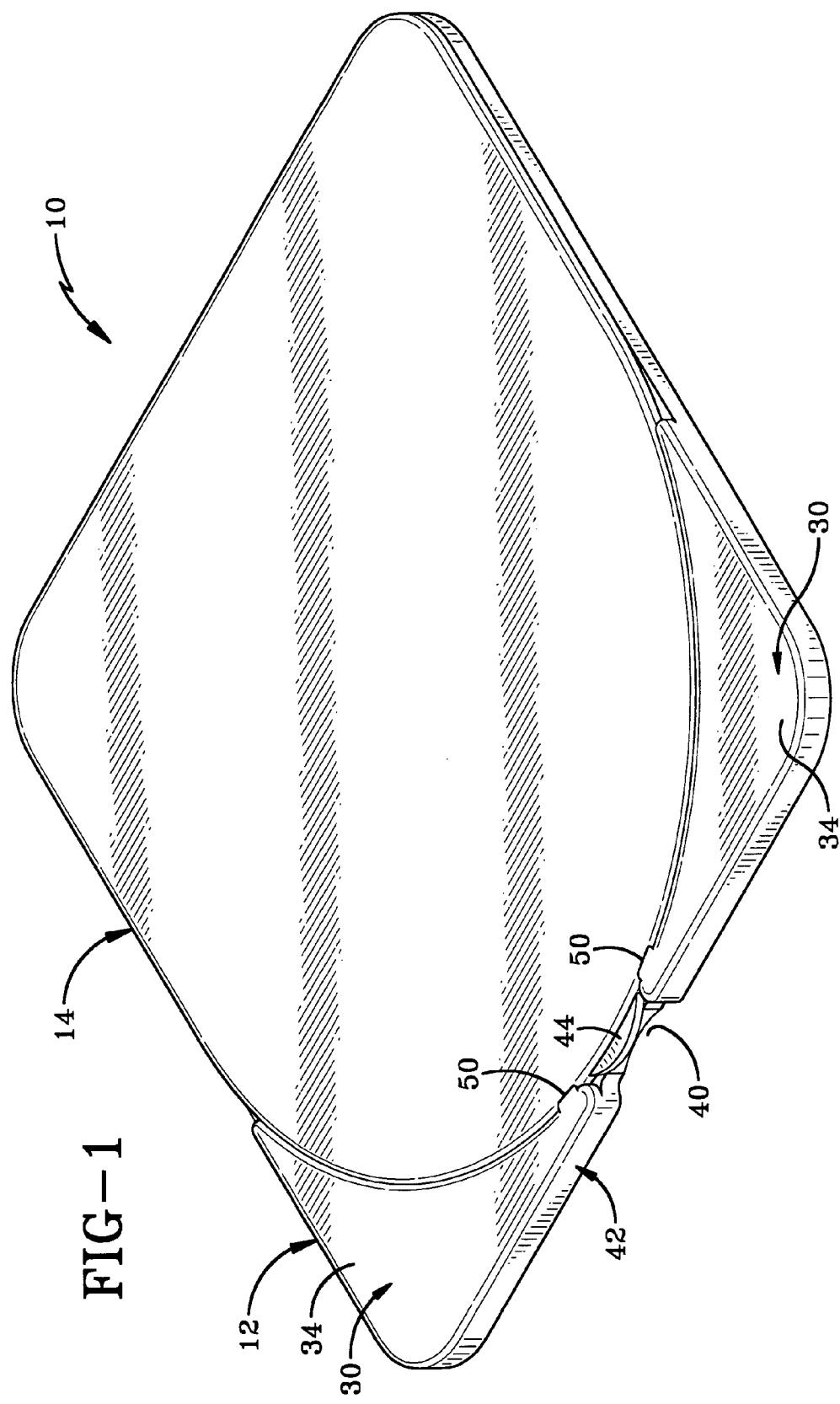
FIG. 1 is a perspective view of the storage container with the lid in a closed position.
Figure 5:
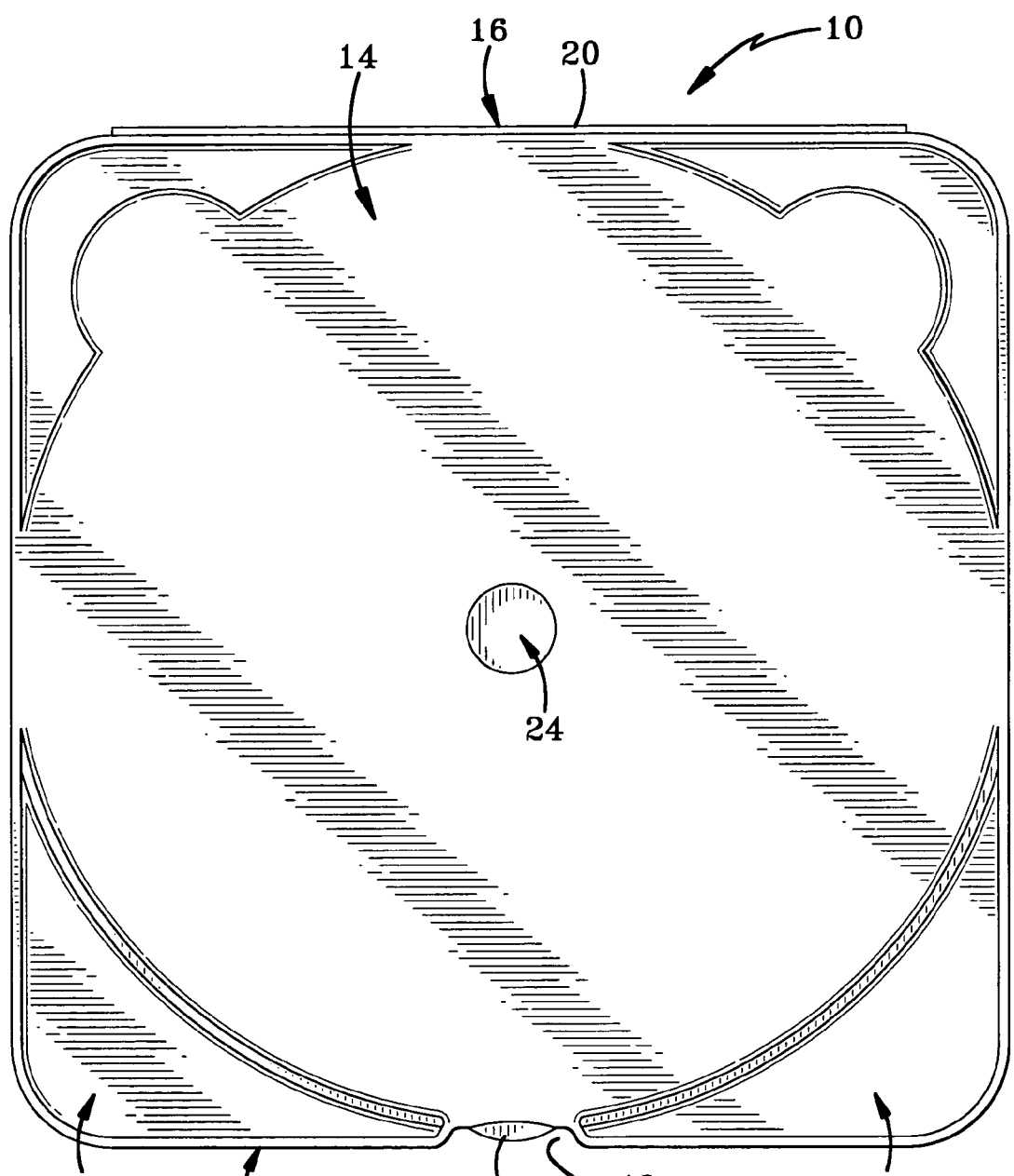
FIG. 5 is a bottom plan view.
Figure 6:
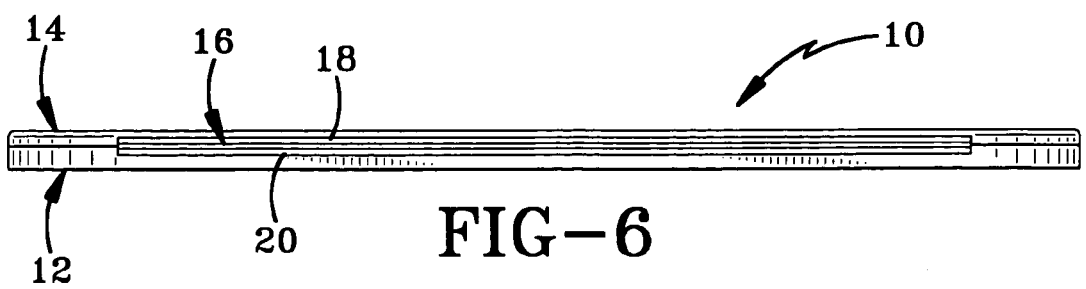
FIG. 6 is a rear elevation view.
Figure 7:
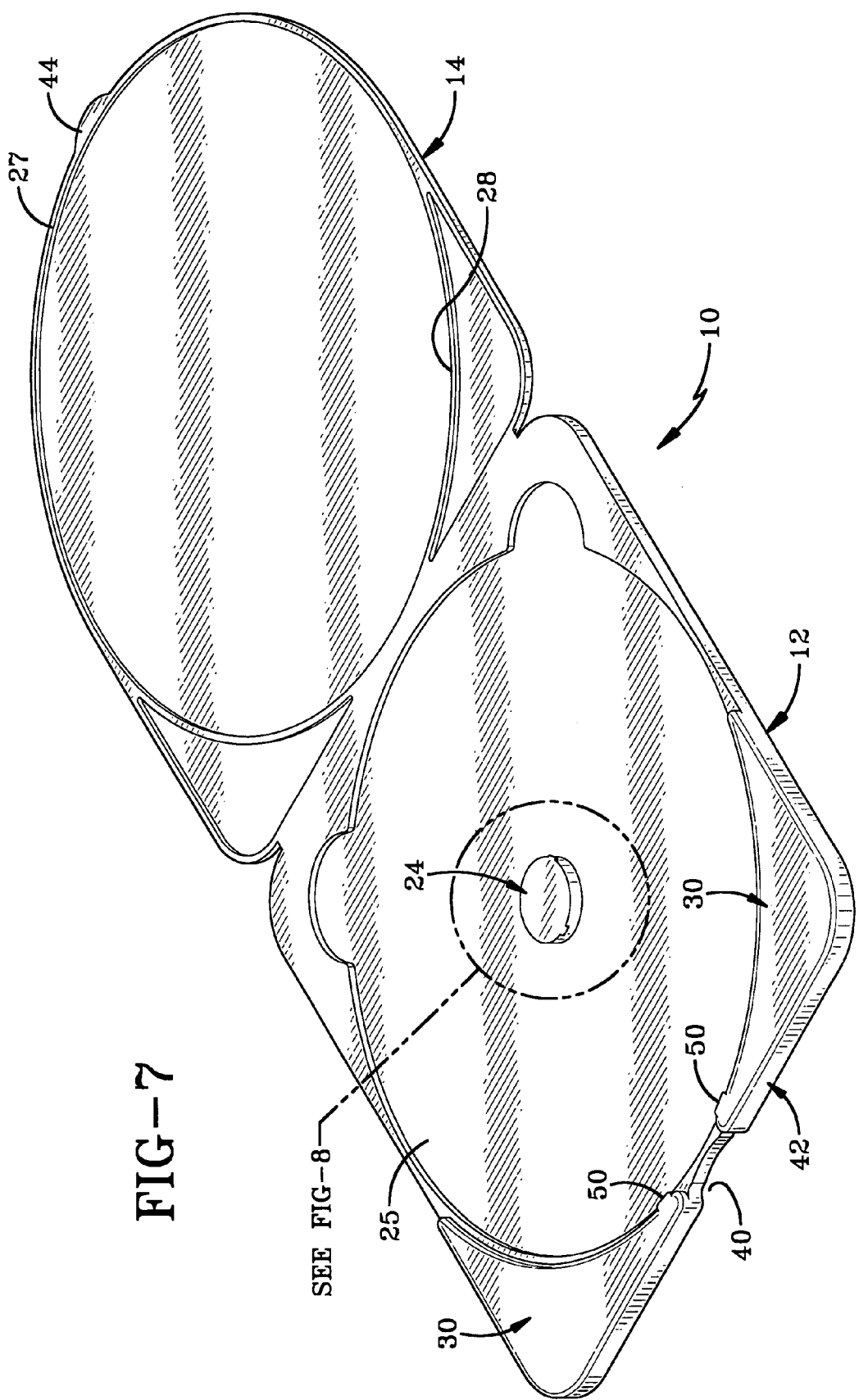
FIG. 7 is a prospective view of the storage container with the lid in the open position.

The storage container of the present invention is indicated generally by the numeral 10 in the accompanying drawings. Storage container 10 generally includes a base 12 and a lid 14 that is movable between open and closed positions. Lid 14 is preferably connected to base 12 by a hinge 16. Hinge 16 is preferably a living hinge that includes first and second hinge portions 18 and 20. Lid 14 is shown in the closed position in FIG. 1 and in open position in FIG. 7. A disc-shaped item of recorded media 22 is held in storage container 10 on a hub 24 that extends up from the middle portion of base 12. Item 22 is entirely enclosed and protected when lid 14 is closed and accessible to the user when lid 14 is open.

Base 12 is substantially square when viewed from a top plan view as shown in FIG. 2 and has rounded corners. Base 12 is sized to receive item 22 with the circumference of item 22 being disposed adjacent the middle portions of the four outer edges of base 12 as shown in FIG. 9. In the preferred embodiment of the present invention, base 12 includes a disc seating area 25 having a diameter slightly greater than the outer diameter of a standard compact disc or DVD (4 and ¾ inch). Hub 24 extends upwardly from the center of disc seing area 25. Base 12 further includes a pair of fingertip access depressions 26 formed in the corners of base 12 adjacent hinge 16. Fingertip access depressions 26 allow the user to remove item 22 from container 10 when the user desires access to item 22.

Lid 14 has a rear wall adjacent hinge portion 18 and a curved front wall 27 extending between substantially parallel side walls. Curved front wall 27 has a diameter slightly larger than the diameter of a standard CD or DVD (4 and ¾ inch). In other embodiments, front wall 27 has a diameter that matches (or is slightly larger than) the diameter of the disc being stored in container 10. Lid 14 further includes a rear wall 28 that cooperates with front wall 27 to define the upper portion of the storage compartment of storage container 10. Walls 27 and 28 thus form a continuous wall about lid 14.

In accordance with one of the objectives of the present invention, base 12 includes a pair of holding tabs 30 that extend out away from disc seating area 25. Holding tabs 30 are disposed on the opposite side of base 12 then hinge 16 and allow the user to firmly grasp base 12 while using container 10 without interfering with lid 14. The position of holding tabs 30 allows the user to hold base with one hand while opening lid 14 with the other hand and handling item 22. In addition to the handling feature, holding tabs 30 provide a substantially symmetric shape to container 10. The substantially symmetric shape is a square having rounded corners. The symmetric shape allows container 10 to be easily handled by automated equipment and stored in a variety of configurations within existing storage container holders.

Holding tabs 30 each have a height 32 that defines the thickest portion of container 10. The upper surface is 34 of tabs 30 are substantially coplanar with the upper surface of lid 14 when lid 14 is in the closed position.

Holding tabs 30 are spaced apart by a gap 40 along the front wall 42 of container 10. A finger tab 44 extends forwardly from lid 14 and is disposed in gap 40 when lid 14 is in the closed position. In the preferred embodiment of the invention, tab 44 is curved and does not extend out past the boundary formed by the edge of wall 42 as shown in FIG. 2.

Latches 50 extend inwardly from holding tabs 30 on either side of gap 40. Latches 50 engage lid 14 directly or, as in the preferred embodiment, snap fit together with protuberances 52 extending outwardly from lid 14. The positioning and structure of latches 50 and finger tab 44 allow the user to grasp container 10 by one or both of holding tabs 30 and manipulate lid 14 from the closed to the open position with the user's other hand. The user may also grasp container 10 by one of holding tabs 30 and open lid 14 by moving finger tab 44 with the user's thumb.

In accordance with another objective of the present invention, item 22 is securely held in storage container 10 by hub 24. Hub 24 has a substantially circular outer circumference that fits within the standard center hole of a CD or DVD. Hub 24 has a height that causes the top wall of the hub to engage the inner surface of lid 14 when lid 14 is in the closed position as depicted in FIGS. 12 and 13. The small height of hub 24 allows storage container 10 to be relatively thin compared to other storage containers known in the art. The overall height of storage container 10 merely includes the thickness of base 12, the height of hub 24, and the thickness of lid 14.

In accordance with another objective of the present invention, hub 24 includes at least one, but preferably a plurality of locking fingers 60 that project radially outwardly from the top of hub 24. The top of each locking finger 60 is preferably coplanar with the top surface of hub 24. Each locking finger 60 is relatively small compared to the circumference and height of hub 24. In the preferred embodiment of the invention, the height of hub 24 is only slightly taller than the height of a standard CD or DVD and may have a height of ¹⁄₁₆ of an inch while each locking finger 60 has a height (or thickness) of ¼ to ¹⁄₁₂ of the hub 24 thickness. Each locking finger may have a height of only 0.01 inches in the preferred embodiment of the invention.

In one embodiment of the invention, each locking finger 60 extends radially outwardly over the upper edge of item 22 so that fingers 60 securely hold item 22 in storage container on hub 24 when item 22 is pushed down over hub 24. Locking fingers 60 are sufficiently flexible to be forced inwardly through the center opening of item 22 when item 22 is pushed over hub 24. In some situations, locking fingers 60 will become trapped between the other circumferential edge of hub 24 and the inner edge of item 22 creating a frictional fit between item 22 and hub 24. In other embodiments of the invention, locking fingers 60 are configured to be wedged between the inner edge of the disc and the outer edge of hub 24 to frictionally hold the disc on hub 24.

In another embodiment of the invention, hub 24 has a larger diameter at its upper surface than at its lower surface. The larger upper diameter is configured to force the disc to be snap fitted over hub 24. The smaller base diameter allows the disc to slightly move while held on hub 24. The larger upper diameter of hub 24 may be achieved by angling the wall of hub 24 or by curving the wall outwardly toward the top of hub 24. The disc preferably rotates on hub 24 in this embodiment and in the embodiments described above. The rotation of the disc prevents hub 24 or container 10 from unnecessarily stressing the disc when the disc is stored in container 10.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A storage container for holding a disc shaped item of recorded media; the disc shaped item of recorded media having a central opening; the storage container comprising:
   a base;
   a hub extending upwardly from the base, the base having a top surface that supports the disc-shaped item of recorded media;
   the hub being adapted to hold a disc shaped item of recorded media;
   the hub including a sidewall and a plurality of locking fingers projecting outwardly from the sidewall, the locking fingers being non-removable from and integrally formed with the sidewall of the hub;
   the sidewall having a height and an upper surface;
   the sidewall being free of openings;
   each of the locking fingers having a height that is substantially less than the height of the sidewall;
   the sidewall being fixed with respect to the base; and
   each of the locking fingers being flexible and adapted to allow a disc shaped item of recorded media to be forced down over the hub and locking fingers until the locking fingers are disposed over the top of the disc shaped item of recorded media with the disc shaped item of recorded media held on the hub.

2. The storage container of claim 1, wherein the height of the locking finger is ¼ to 1/12 of the height of the sidewall.

3. The storage container of claim 2, wherein the height of the of the sidewalls is 1/16 inch.

4. The storage container of claim 1, wherein the height of the locking finger is 0.01 inches.

5. The storage container of claim 1, wherein the locking finger has an upper surface that is substantially coplanar with the upper surface of the sidewall of the hub.

6. The storage container of claim 1, wherein the sidewall of the hub is cylindrical.

7. The storage container of claim 1, wherein the sidewall of the hub is continuous.

8. The storage container of claim 1, further comprising a disc shaped item of recorded media held on the hub with the locking fingers disposed over the top of the disc-shaped item of recorded media.

9. A storage container for holding a disc shaped item of recorded media; the storage container comprising:
   a base defining a disc seating area adapted to receive the disc shaped item of recorded media;
   a hub connected to the base and disposed in the disc seating area;
   the hub being adapted to hold the disc shaped item of recorded media;
   the hub including a continuous cylindrical sidewall and a flexible locking finger projecting outwardly from the sidewall, the locking finger being integrally formed with the sidewall of the hub;
   the sidewall having a height and an upper surface;
   the locking finger having a height substantially less than the height of the sidewall;
   the sidewall being substantially unmoveable;
   the sidewall being free of openings;
   the locking finger being adapted to allow a disc shaped item of recorded media to be forced down over the hub and locking finger until the locking finger is disposed over the top of the disc shaped item of recorded media with the disc shaped item of recorded media held on the hub;
   a lid hingedly connected to the base between open and closed positions; and
   the lid covering at least a portion of the disc seating area when the lid is in the closed position.

10. The storage container of claim 9, wherein the height of the locking finger is ¼ to 1/12 of the height of the sidewall.

11. The storage container of claim 10, wherein the height of the sidewall is 1/16 inch.

12. The storage container of claim 9, wherein the height of the locking finger is 0.01 inches.

13. The storage container of claim 9, wherein the locking finger has an upper surface that is substantially coplanar with the upper surface of the sidewall of the hub.

14. The storage container of claim 9, wherein the hub is tubular and open at a bottom surface of the base.

15. The storage container of claim 9, further comprising a disc shaped item of recorded media held on the hub with the locking fingers disposed over the top of the disc-shaped item of recorded media.

16. A storage container for holding a disc shaped item of recorded media; the disc shaped item of recorded media having an inner edge that defines a central opening; the storage container comprising:
   a base;
   a hub extending upwardly from the base;
   the hub being adapted to hold the disc shaped item of recorded media to the base;
   the hub including a sidewall and a deflectable locking finger projecting outwardly from the sidewall; the sidewall having an upper surface;
   the locking finger having an upper surface that is substantially coplanar with the upper surface of the sidewall of the hub;
   the sidewall having a height of 1/16 inch;
   the locking finger having a height of ¼ to 1/12 the height of the sidewall;
   the sidewall being fixed with respect to the base; and
   the locking finger being adapted to be deflected by the inner edge of the disc shaped item of recorded media to allow a disc shaped item of recorded media to be forced down over the hub and locking finger until the locking finger is disposed over the top of the disc shaped item of recorded media with the disc shaped item of recorded media held on the hub.

17. The storage container of claim 16, wherein the height of the locking finger is 0.01 inches.

18. The storage container of claim 16, further comprising a disc shaped item of recorded media held on the hub with the locking fingers disposed over the top of the disc-shaped item of recorded media.

19. The storage container of claim 16, further comprising a lid connected to the base; the lid having an inner surface; the inner surface of the lid engaging the upper surface of the locking finger when the lid is closed with respect to the base.

* * * * *